(12) United States Patent
Dervaes et al.

(10) Patent No.: US 11,612,840 B2
(45) Date of Patent: Mar. 28, 2023

(54) FILTER LIFE DETERMINATION

(71) Applicant: Hach Company, Loveland, CO (US)

(72) Inventors: Nelson E. Dervaes, Fort Collins, CO (US); Lynn Ruth Leone, Fort Collins, CO (US)

(73) Assignee: HACH COMPANY, Loveland, CO (US)

( * ) Notice: Subject to any disclaimer, the term of this patent is extended or adjusted under 35 U.S.C. 154(b) by 0 days.

(21) Appl. No.: 17/108,629

(22) Filed: Dec. 1, 2020

(65) Prior Publication Data
US 2022/0168674 A1 Jun. 2, 2022

(51) Int. Cl.
| B01D 35/143 | (2006.01) |
| B01D 37/04 | (2006.01) |
| C02F 1/00 | (2023.01) |
| G01N 15/08 | (2006.01) |
| C02F 101/12 | (2006.01) |
| C02F 103/34 | (2006.01) |

(52) U.S. Cl.
CPC .......... *B01D 35/143* (2013.01); *B01D 37/04* (2013.01); *C02F 1/001* (2013.01); *G01N 15/08* (2013.01); B01D 2201/54 (2013.01); C02F 2101/12 (2013.01); C02F 2103/34 (2013.01); C02F 2209/29 (2013.01); C02F 2209/445 (2013.01); G01N 2015/084 (2013.01)

(58) Field of Classification Search
CPC .. B01D 35/143; B01D 2201/54; B01D 37/04; G01N 15/08; G01N 2015/084; G01N 33/18; C02F 1/001; C02F 2101/12; C02F 2103/34; C02F 2209/29; C02F 2209/445

USPC .......................................................... 210/739
See application file for complete search history.

(56) References Cited

U.S. PATENT DOCUMENTS

2005/0251366 A1* 11/2005 Kahn ................... G01N 33/18
702/188

FOREIGN PATENT DOCUMENTS

| CN | 205222848 U |   | 5/2016 |   |           |
| CN | 205222873 U |   | 5/2016 |   |           |
| CN | 106115961 A | * | 11/2016 | ............. | G01N 15/08 |
| CN | 109179520 A | * | 1/2019 | ............. | G01N 15/08 |
| JP | H06335672 A |   | 12/1994 |   |           |

OTHER PUBLICATIONS

CN 109179520 A English description, Jan. 2019, Li Jiongxian.*
CN 106115961 A English description, Nov. 2016, Jiang Jian.*
European Patent Office, International Search Report, dated Mar. 14, 2022, 5 pages.

* cited by examiner

Primary Examiner — Akash K Varma
(74) Attorney, Agent, or Firm — Ference & Associates LLC

(57) ABSTRACT

An embodiment provides a method for determining a filter life, including: introducing an aqueous sample into a filtration device comprising at least one filter and one or more sensors located upstream of the at least one filter, wherein the one or more sensors are capable of measuring a component of the aqueous sample; measuring the component of the aqueous sample using the one or more sensors; identifying a load on the at least one filter based upon the measuring of the component of the aqueous sample and at least one filtration characteristic; and determining the filter life of the at least one filter based upon the identifying. Other aspects are described and claimed.

10 Claims, 5 Drawing Sheets

FILTER LIFE DETERMINATION

BACKGROUND

This application relates generally to determining the life of a filter, and, more particularly, to the measurement of a component in an aqueous sample and determining filter life.

Ensuring water quality is critical in a number of industries such as drinking water, pharmaceuticals, industrial processes and other manufacturing fields. Additionally, ensuring water quality is critical to the health and well-being of humans, animals, and plants which are reliant on the water for survival. One element that is typically measured is chlorine. Regarding industrial processes, too much chlorine in water can damage turbine, heat exchangers, or the like. Chlorine may also damage filters in a filtration system. For example, chlorine may attack the materials in the turbines or the like. Also, when chlorine damages the filters, the filters may not remove dissolved solids, or other components effectively, leading to damage in the turbines and heat exchangers. In other words, the parts may become coated and reduce heat transfer, create friction, or the like. Chlorine may be present from natural or human activities such as disinfection, or the like. Measurement and mitigation of chlorine may result in higher costs of water treatment as chlorine may damage expensive equipment and shorten filter life. Therefore, detecting the presence and concentration of chlorine in water or other liquid solutions is vital.

BRIEF SUMMARY

In summary, one embodiment provides a method for determining a filter life, comprising: introducing an aqueous sample into a filtration device comprising at least one filter and one or more sensors located upstream of the at least one filter, wherein the one or more sensors are capable of measuring a component of the aqueous sample; measuring the component of the aqueous sample using the one or more sensors; identifying a load on the at least one filter based upon the measuring of the component of the aqueous sample and at least one filtration characteristic; and determining the filter life of the at least one filter based upon the identifying.

Another embodiment provides a measurement device for determining a filter life, comprising: at least one filter; one or more sensors located upstream of the at least one filter; a processor; and a memory device that stores instructions executable by the processor to: introduce an aqueous sample into a filtration device comprising the at least one filter and the one or more sensors located upstream of the at least one filter, wherein the one or more sensors are capable of measuring a component of the aqueous sample; measure the component of the aqueous sample using the one or more sensors; identify a load on the at least one filter based upon the measuring of the component of the aqueous sample and at least one filtration characteristic; and determining the filter life of the at least one filter based upon the identifying.

A further embodiment provides a product for determining a filter life, comprising: a storage device having code stored therewith, the code being executable by the processor and comprising: code that introduces an aqueous sample into a filtration device comprising at least one filter and one or more sensors located upstream of the at least one filter, wherein the one or more sensors are capable of measuring a component of the aqueous sample; code that measures the component of the aqueous sample; code that identifies a load on the at least one filter based upon the measuring of the component of the aqueous sample and at least one filtration characteristic; and code that determines the filter life of the at least one filter based upon the identifying.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
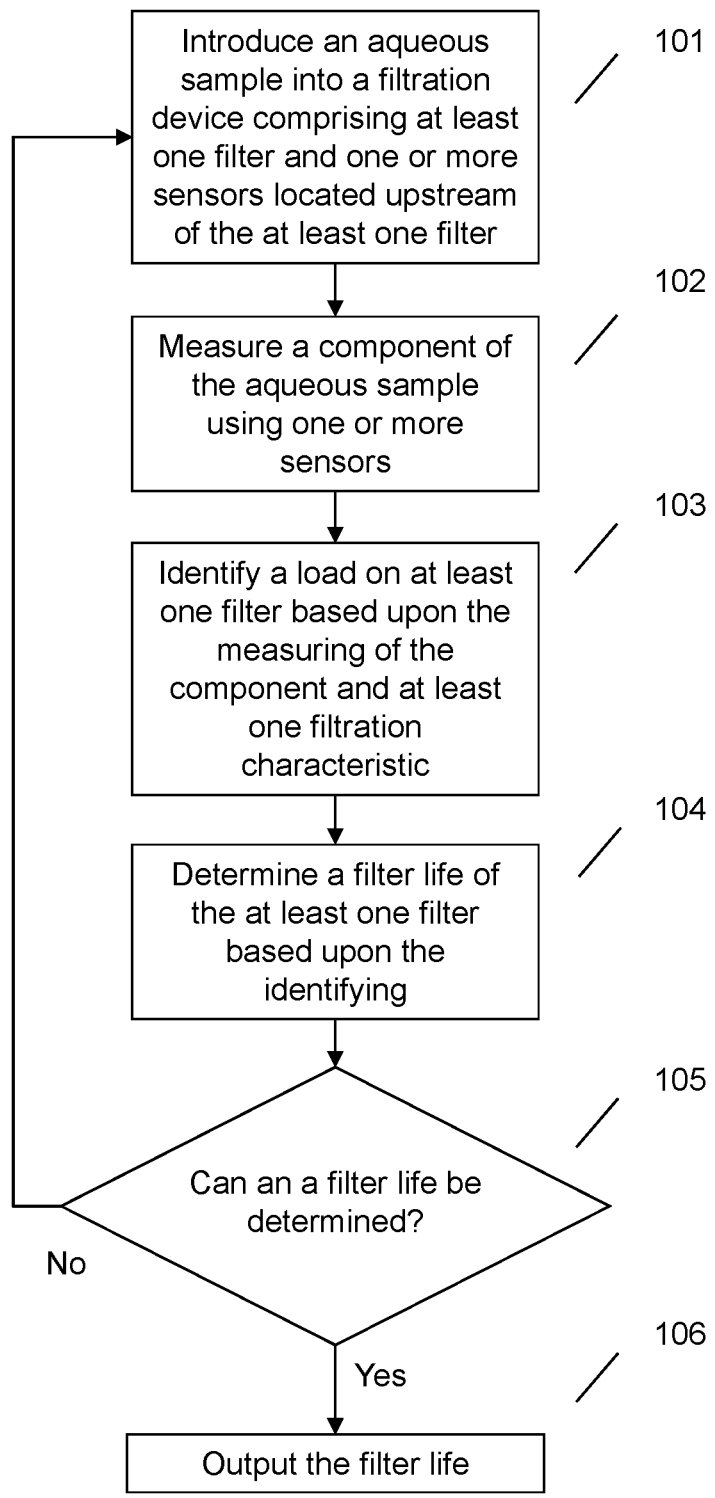
FIG. 1 illustrates a flow diagram of an example filter life determining system.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Chlorine removal from a water source or aqueous sample may be an important step in water filtration. For example, chlorine may be filtered for drinking water, food/beverage industries, pharmaceuticals, feed water for industrial processes, or the like. Improperly treated feed water for industrial processes may damage industrial equipment. As another example, a user or entity may want the chlorine in a body of water to be under a particular threshold, therefore, the user may measure and, filter, or remove the chlorine in order to determine if the amount of chlorine is under that threshold. Chlorine may be present in a body of water either naturally or from human activity such as manufacturing, storage, or treatment conditions. Higher levels of chlorine may provide an unappealing taste, foul or degrade piping or filters, interfere with measurements, or the like.

Filtration represents a large cost to a facility. For example, a facility may have a large number of filters. Changing filters involves the cost of the filters, the personnel hours to change the filters, and down time for replacement. If a filter is replaced too early, the full filtration life of filter life has not been realized. If a filter is changed too late, the filter may have poor performance, restrict flow, perforate, fail, or the like.

Conventional methods for determining filter life may have limitations discussed herein. Conventional methods may be based upon a time of use of a filter. For example, a log or record of filter changes may be written or entered. As another example, a facility may simply write a date upon a filter when installed. A facility may have to visually inspect a filter, look for dates of service on the filter, or the like. Conventional methods present a "reactive" approach to filter life. What is needed is a "proactive" approach to monitor the efficiency of the filter to determine when a useful life is completed or nearing completion.

Other facilities may wait for a failure to replace a filter. This may not allow for preventative maintenance of the filters. At a time of failure the facility may replace many filters which may not require replacement. Such techniques add to the cost, time, and inefficiency of a filtration system within a facility.

Industrial facilities, food/beverage, pharmaceutical, water treatment, or the like require clean water for their processes. Some facilities use Reverse Osmosis (RO) filters in banks of filters which may cost roughly $50,000 to $200,000 USD. Facilities may purchase filters or contract for their replacement. A facility's profitability may be based on a predicted life of RO membranes and associated cost of the filters and personnel hours to replace/maintain the filters. For example, a RO membrane may be rated for 1,000 ppm-hrs (part per million-hours) of chlorine exposure before replacement. This example would be roughly 38 ppb (parts per billion) of continuous chlorine exposure for the expected 3 years. For simplicity, the disclosure may use the term filter to refer to a unit that may contain a membrane and other associated parts for filtering an aqueous sample.

Thus, facilities may filter water by Reverse Osmosis using expensive banks of membranes to filter the water. Facilities may plan and budget to use the membranes for approximately 3 years, although this time may vary based upon filters and conditions. The membranes may deteriorate for several reasons, with chemical attack by chlorine being a primary culprit. Membrane manufacturers may rate the membranes for 1,000 ppm-hrs of chlorine contact, which may vary based upon filtration conditions. For example, this may equate to an average of 38 ppb (parts per billion) or 0.038 ppm (parts per million) continuously flowing through the membranes for 3 years. This example falls within an ultra-low level of chlorine.

Currently, there is no reliable method to continuously measure ultra-low levels of chlorine exposure. Because the low levels may not be measured, facilities may over-dose sodium bisulfite to remove chlorine. The sodium bisulfite over-dosing may damage filter membranes and cause premature failure. In an embodiment, an ultra-low chlorine analyzer capable of measuring chlorine in the 38 ppb range may be used to measure a component. As an example, by taking the product of the each measurement times the measurement interval, and then summing them, we may determine a reasonable estimate of the magnitude of ppm-hrs of chlorine contact that the membranes have experienced. This may provide a leading indicator to the facility if membranes are on track to last the desired time. A measurement time interval may be selected to be a "snapshot" of time associated with filter use or the entirety of filter use.

Reverse Osmosis (RO) filters may remove dissolved solids from an aqueous sample. Chlorine may be removed from the water upstream of the filter because it may destroy the membranes in the RO system by increasing the size of the pores in the filter. Chlorine may be measured as a component in the aqueous sample, and may not be physically filtered from the water. Chlorine may be removed by chemically binding it to carbon or reacting it with sodium bisulfite, or other methods. In this manner, a measured component such as chlorine may be different from what the RO system filters, but the portion of chlorine that passes through the filter may degrade the filter by enlarging the pores, allowing more dissolved solids to pass through. The system and method described herein may protect expensive industrial components or parts such as turbines, heat exchangers, or the like.

Accordingly, an embodiment provides a system and method for determining a filter life of a filtration device. The determining may be similar to an estimation of a filter life, however, a determination may account for additional parameters discussed herein. In an embodiment, a filter life may be a remaining filter life. In an embodiment, the method and system may have one or more sensors. The one or more sensors may be located upstream from at least one filter. The one or more sensors may measure a component in an aqueous sample. The component may be chlorine. The at least one filter may filter either the component or another component of the aqueous sample. The method and system may measure a component and/or filtration characteristics to identify a load on a filter. In an embodiment, the system and method may determine a filter life. In an embodiment, a filter life may be determined by calculating cumulative chlorine passing through a filter or membrane. In another embodiment, the system and method may extrapolate a trend to predict or determine a time when the filter reaches the end of its life. In a further embodiment, the system and method may monitor a consistency of the data to provide a confidence level of a prediction or determination of a filter life. In an embodiment, a user or system may select a time period for determination of a filter life. A determined filter life may be compared to an expected filter life. In an embodiment, a notification or alarm may indicate a filter is nearing or has reached a usable time limit. In an embodiment, a notification or alarm may indicate a cumulative chlorine limit has been reached, is nearing, or has been exceeded.

The illustrated example embodiments will be best understood by reference to the figures. The following description is intended only by way of example, and simply illustrates certain example embodiments.

Referring to FIG. 1, an example system and method for determining a filter life is illustrated. A filtering device may have one or more filters. The filter may filter either the measured component or another component from an aqueous sample. In an embodiment, the component may be chlorine. In an embodiment, a filtering device may have at least one filter. The filtering device may have one or more sensors. The aqueous sample may be a fluid such as drinking water, fluid for food/beverage, pharmaceuticals, feed water for industrial process water, or the like.

At 101, in an embodiment, an aqueous sample may be introduced to filtration device. The aqueous sample may contain an amount of a component. In an embodiment the component may be chlorine. The component may be another species, chlorine is an example used for simplicity of the disclosure. The filtration device may have at least one filter capable of filtering the component or another component from the aqueous sample. The filtration device may have one or more sensors. The one or more sensors may be capable of measuring the component of the aqueous sample. The one or more sensor may be located in a position upstream, or prior to, the at least one filter. In this manner, a sensor may measure the component passing through at least one filter.

The aqueous sample may be an aqueous sample which may include a sample from a natural body of water, a holding tank, a processing tank, a pipe, or the like. The aqueous sample may be in a continuous flow, a standing volume of liquid, or any combination thereof. In one embodiment, the solution may be introduced to one or more chambers, vessels, or piping for example, a measurement chamber of the filtration device. Introduction of the aqueous sample into the filtration device may include placing or introducing the solution into the filtration device manually by a user or using a mechanical means, for example, gravity flow, a pump, pressure, fluid flow, or the like. For example, a water sample for filtration may be introduced to a measurement or test chamber using a pump. In an embodiment, valves or the like may control the influx and efflux of the solution into or out of the one or more chambers, vessels, or piping, if present.

Additionally or alternatively, the filtration device may be present or introduced in a volume of the aqueous sample. The filtration device is then exposed to the volume of aqueous sample. The system and associated measurements may be a flow-through system in which a solution and/or reagents are automatically mixed and measured. Once the sample is in contact with the filtration or measurement system, the system may measure the component of the sample, as discussed in further detail herein. In an embodiment, the filtration or measurement device may include one or more chambers in which the one or more method steps may be performed.

At 102, in an embodiment, the method and system may measure a component of the aqueous sample. The measurement may be performed by one or more sensors. The sensors may be capable of measuring the component in the aqueous sample. In an embodiment the component measured may be chlorine. Other components may be measured, such as dissolved solids, and are disclosed. A measurement of a component may performed by one or more sensors capable of measuring the component or another component filtered by the at least one filter.

Measurement of chlorine may be performed by various methods. For example, the one or more sensors may be a component or portion of a colorimeter, amperometric, optic, or like systems. The measurement may be of free or total chlorine. Measurement may be performed using a method described in U.S. patent application Ser. No. 16/433,752, titled ULTRA LOW RANGE FREE CHLORIDE MEASUREMENT, and filed Jun. 6, 2019 which is incorporated by reference in its entirety herein. Briefly, the system and method described may measure chlorine at ultralow range (ULR) concentrations with improved reagent stability under ambient conditions. In an embodiment, the method may not use traditional DPD chemistry. In an embodiment, the method may detect free chlorine in concentrations below 20 parts per billion (ppb), and may yield accurate concentration measurement of free chlorine as low or lower than 1 ppb. In an embodiment, the method may use a fluorometric method. The indicator to give a fluorescence signal may be a thiocarbamate derivative. The thiocarbamate derivative may be a coumarin based fluorophore. The thiocarbamate-based indicator may be a methylumbelliferone thiocarbamate. In an embodiment, the fluorescence intensity may be correlated to ULR detection of free chlorine. In an embodiment, the pH of a solution may be adjusted to activate the reporter or indicator molecule.

The system and method may determine if a free chlorine concentration may be measured. In an embodiment, the presence of free chlorine in an aqueous solution may cause an increase in fluorescence intensity of the thiocarbamate-based indicator. In an embodiment, the thiocarbamate derivative may be selective for free chlorine and react with free chlorine in an aqueous environment releasing a fluorescence active molecule. Therefore, the fluorescence intensity, of a solution containing free chlorine may be correlated to the concentration of the free chlorine in the aqueous solution. Fluorescence curves may be generated for a range of free chlorine concentrations, for different thiocarbamate-based indicators, for any different condition that may affect absorption or fluorescence values (e.g., temperature, sample content, turbidity, viscosity, measurement apparatus, aqueous sample chamber, etc.), or the like.

Alternatively or additionally, free chlorine concentration measurement may be at periodic intervals set by the user or preprogrammed frequencies in the device. Measurement of free chlorine by a device allows for real time data with very little human involvement in the measurement process. Cleaning of the fluorometric chamber may be required at an unspecified time interval. A programmed calibration curve may be entered into the device.

A chamber, vessel, cell, chamber, pipe, or the like may contain an aqueous sample, at least one thiocarbamate-based indicator, and associated reagents such as buffers and/or additives. A device may contain one or more bottles of reagents which contain necessary reagents. The reagents contained in the one or more bottles may be pump fed or gravity fed. The flow of the reagents may be metered to ensure proper volume delivery to the measurement cell. The aqueous sample may be fed through a pressured inlet, a vessel, or the like. The aqueous sample may be introduced into the measurement chamber by a pump or gravity fed. The sampling device may be in series or parallel to an aqueous flow. The device may have a system to ensure proper mixing of the aqueous sample, and as an example the thiocarbamate-based indicator and related reagents.

The fluorescence intensity or free chlorine concentration may be an output upon a device in the form of a display, printing, storage, audio, haptic feedback, or the like. Alternatively or additionally, the output may be sent to another device through wired, wireless, fiber optic, Bluetooth®, near field communication, or the like. An embodiment may use an alarm to warn of a measurement or concentration outside acceptable levels. An embodiment may use a system to shut down water output or shunt water from sources with unacceptable levels of a component. For example, a component measuring device or sensor may use a relay coupled to an electrically actuated valve, or the like.

At 103, in an embodiment, the system and method may identify a load on at least one filter. The identification may be based upon the measuring of the component in the aqueous sample. The identification may be based upon at least one filtration characteristic. A filtration characteristic may be logged or recorded to the system. A filtration characteristic may include a time, date, length of service of a filter, a manufacturer expected lifetime of a filter, filtration pressure, volume, beginning concentration of a filtered component in an aqueous sample, type of filter, filter medium, filter size, filter efficiency, number of filters in a larger filtration unit, temperature, aqueous sample content, turbidity, viscosity, or the like. In an embodiment, the method and system may use one or a combination of filtration characteristics to determine a filter life. In an embodiment, measuring the component and/or use of filtration characteristics may determine a "load" upon a filter. A filtration characteristic any data relating to filtration of the component or another component of the system. In an embodiment, a filtration characteristic may be used in combination with measurement of a component to determine a filter life.

At 104, in an embodiment, the system and method may determine a filter life of the at least one filter based upon the identifying. In an embodiment, the filter life may be determined based upon the measuring of the component and/or the filtration characteristics. For example, the system and method may use the measurement of a component in an aqueous sample and may combine filtration characteristics described herein to predict or determine a filter life. Facilities may use banks of filters. A filter life may be determined for a bank of filters, a subset of a bank of filters, an individual filter, or the like. In an embodiment, an aqueous sample may be a homogeneous sample in which one or more sensors may be placed upstream of all or only a subset of filters. The system and method may be able to differentiate filtration zones in situations wherein an aqueous sample is not homogenous. The system and method may use different approaches to determine a filter life.

Figure 2:
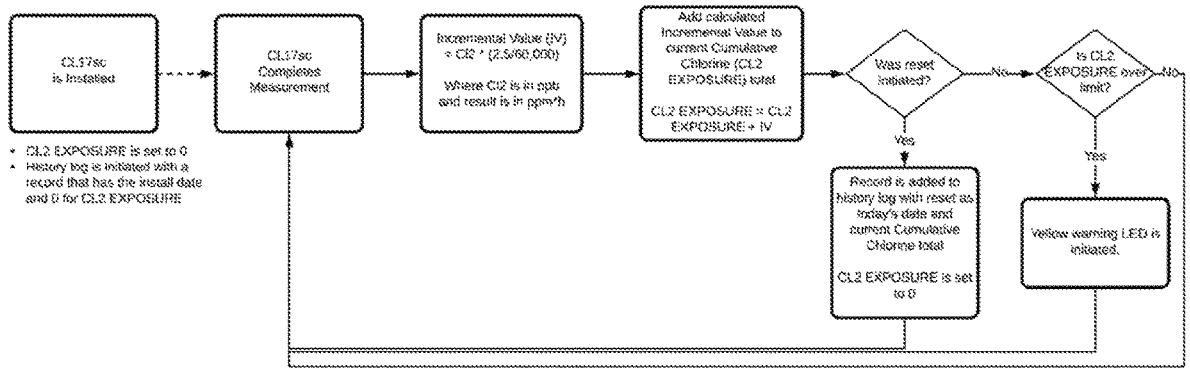
FIG. 2 illustrates a flow diagram of an example operation of a cumulative chlorine measurement.
Figure 3:
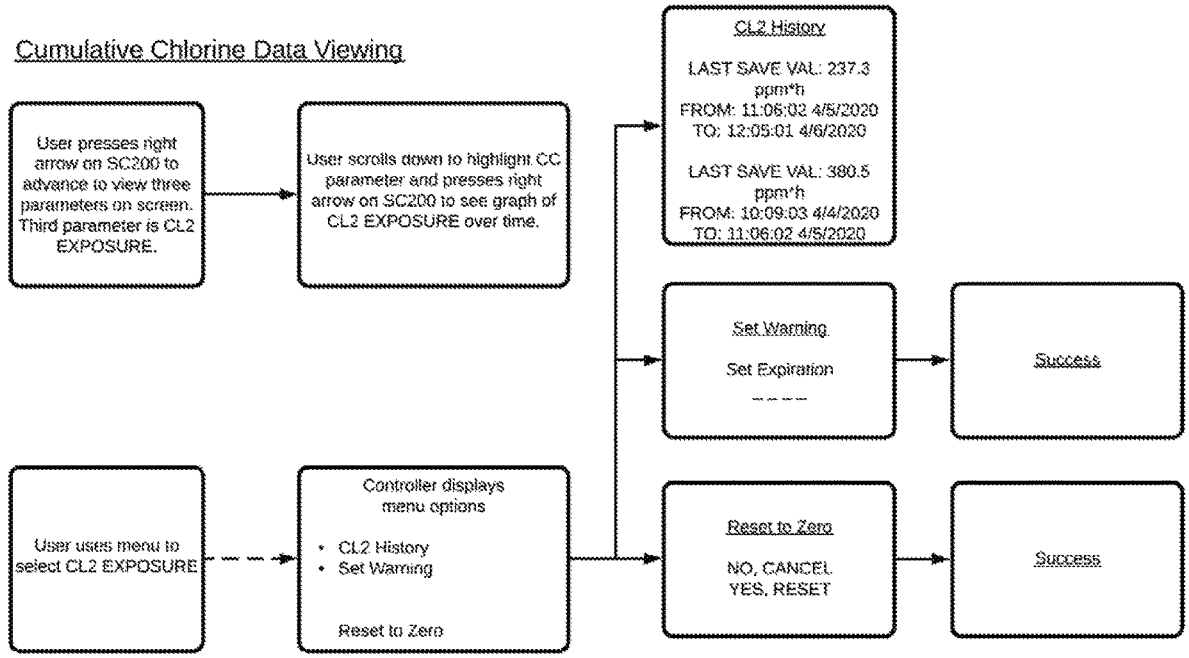
FIG. 3 illustrates a flow diagram of an example cumulative chlorine data interface.

In an embodiment, a filter life may be determined by calculating cumulative chlorine passing through a filter or membrane. See FIG. 2. In other words, the system and method may keep track of a total amount of a component, such as chlorine, to pass through the filter over time. The time period may be set by a user or the system. The time period may be the entire time a filter has been used, a snap shot of time, or any length of time. As an example, a user or the system may set a starting date and time. The start point may be when a filter is installed, when a particular batch of aqueous sample of run through filtration, reset by a user or system, or the like. The system may then calculate an incremental exposure. For example, the system may multiply a measured concentration of a component time a constant. Specifically, the system may multiply a concentration in ppm times 0.0417 hours for a filter with an expected life of 3 years. The system may then add each incremental value to an exposure sum from the beginning start date and time after each measurement cycle. In other words, the method and system keeps track of a cumulative amount of a component filtered by or exposed to the filter over time. See FIG. 3. An increase to the measured amount of a component may shorten a filter life. And a decrease to the measured amount of a component may increase a filter life. In an embodiment, an alarm or warning may indicate a filter is nearing or has reached the end of its expected life.

In another embodiment, the system and method may extrapolate a trend to predict or determine a time when the filter reaches the end of its life. For example, the system may plot a component concentration over time or measurement cycles. A trend may be fitted to this plot. In an embodiment, a simple linear extrapolation using the slope from a start date/time to the current date/time may be used. This method may be most useful if the aqueous sample containing the component maintains a similar component concentration over the time of filtration. In another embodiment, a non-linear extrapolation may be used to fit the plot. This method may be useful in a component concentration varies over the time of filtration. The extrapolation may be used to determine how much life of the filter has been used and a projected time to the end of the filter useful life.

An extrapolation may be performed to the accumulated value to determine when the membrane might reach the 1000 ppm-hrs limit for example. The system may predict a date when a facility will need to replace/maintain the membranes. The extrapolation may be based on trending from installation date until now, just the last X months, just the last month, or the like. The user or system may toggle between different alternatives, or monitor multiple alternatives, to see how the predicted end date varies. This may have additional benefit, not just in the predicted replacement date, but also by allowing a facility who is heading towards early filter or membrane replacement, to see how recent improvements (reduction in chlorine passing through the membranes) may alter their projected replacement date. The system may help to determine how recent spikes might have shortened the expected life. An extrapolation may be a simple linear addition to the currently-known cumulative sum of ppm-hrs of chlorine based on a trend of a selected time period. Additionally, a 2nd-order polynomial may be fit for a more accurate determination of filter life. Further mathematical fitting of a data curve may be used and are disclosed.

Figure 4:
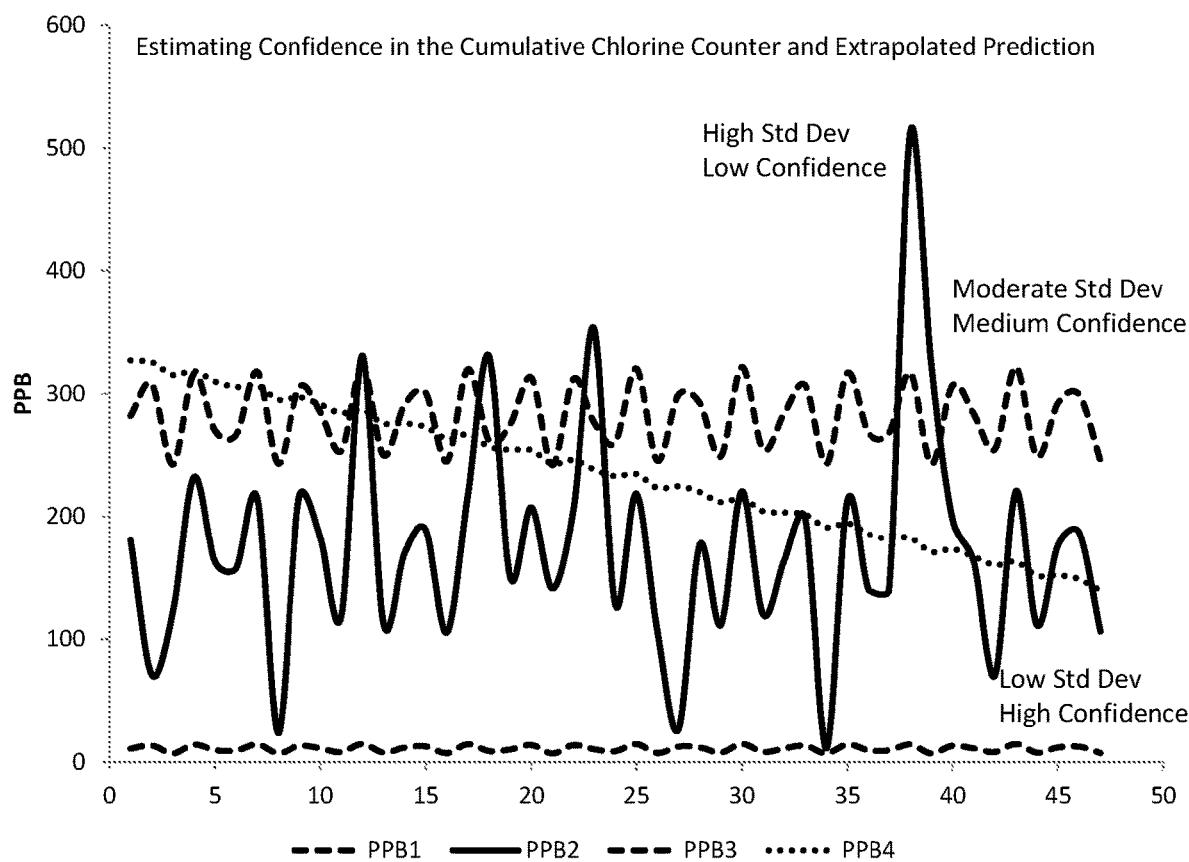
FIG. 4 illustrates example data for providing a confidence in a cumulative chlorine counter and an extrapolated prediction.

In a further embodiment, the system and method may monitor a consistency of the data to provide a confidence level of a prediction or determination of a filter life. See FIG. 4. For example, a measured component concentration may be plotted over time. For a given plot, a confidence score may be determined given the standard deviation of the plot. As an example, a plot with a high standard deviation may yield a low confidence score. As another example, a low standard deviation may yield a high confidence score. In other words, a large variation in a component concentration gives a lower confidence to a filter life determination as the amount of the component varies over a given time. In contrast, a small or no variation in a component concentration gives a higher confidence to a filter life determination as the amount of the component remains more consistent over time.

At 105, in an embodiment, if a filter life cannot be determined, the system may continue to measure a component of the aqueous sample. Additionally or alternatively, the system may output an alarm, log an event, or the like. If a filter life can be determined, the system may provide a filter life determination at 106. The filter life determination may be an output that is provided to a device in the form of a display, printing, storage, audio, haptic feedback, or the like. Alternatively or additionally, the output may be sent to another device through wired, wireless, fiber optic, Bluetooth®, near field communication, or the like.

An embodiment may use an alarm to warn of a measurement or determination outside acceptable levels. An embodiment may use a system to shut down water output or shunt water from sources with unacceptable filter life remaining. For example, the device may use a relay coupled to an electrically actuated valve, or the like. The system may connect to a communication network. The system may alert a user or a network. This alert may occur whether a filter life is determined or not. An alert may be in a form of audio, visual, data, storing the data to a memory device, sending the output through a connected or wireless system, printing the output or the like. The system may log information such as the measurement location, a corrective action, geographical location, time, date, number of measurement cycles, or the like. The alert or log may be automated, meaning the system may automatically output whether a correction was required or not. The system may also have associated alarms, limits, or predetermined thresholds. For example, if a filter life reaches a threshold or set point. Alarms or logs may be analyzed in real-time, stored for later use, or any combination thereof. For example, an alarm may indicate a current concentration of a component is above a desired threshold.

The various embodiments described herein thus represent a technical improvement to conventional methods regarding filter life. Using the techniques as described herein, an embodiment may use a system and method to measure a component in an aqueous sample at ultra low range concentrations to determine a filter life.

Figure 5:
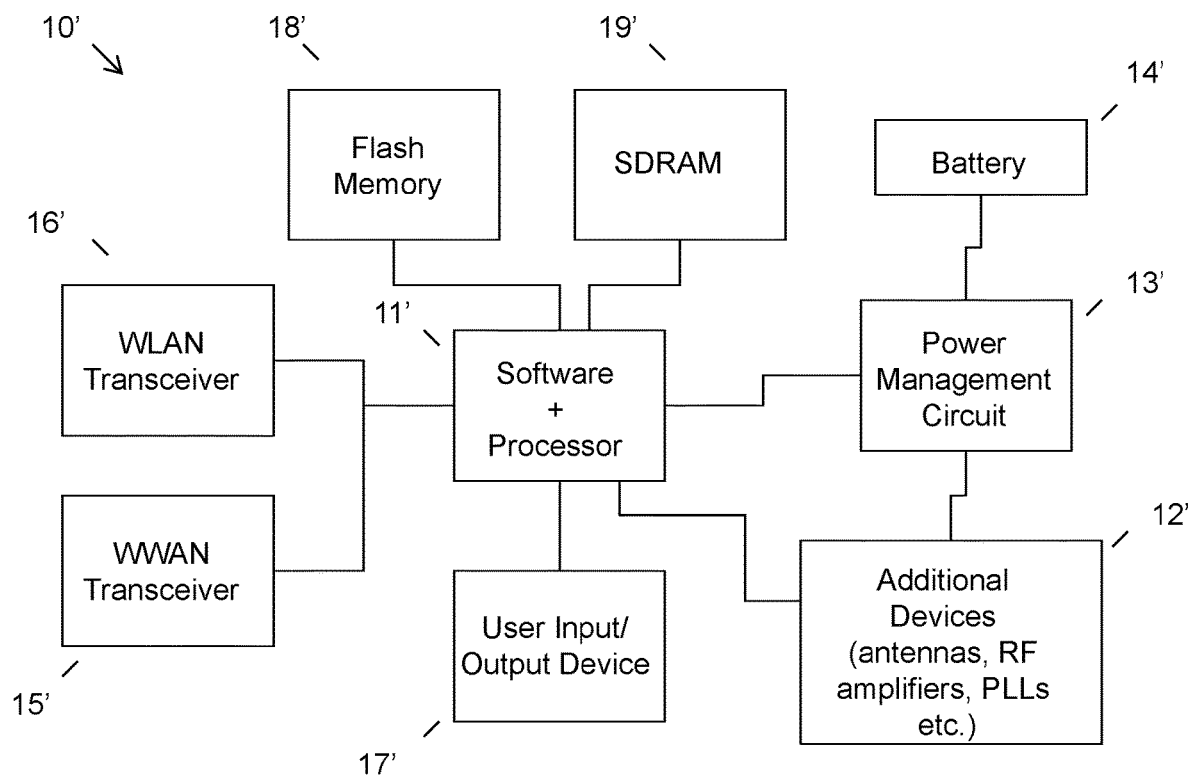
FIG. 5 illustrates an example of computer circuitry.

While various other circuits, circuitry or components may be utilized in information handling devices, with regard to an instrument for determination of a filter life according to any one of the various embodiments described herein, an example is illustrated in FIG. 5. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment to perform determination of a filter life.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for determining a filter life, comprising:
introducing an aqueous sample and a thiocarbamate-based indicator into a filtration device comprising at least one filter and one or more sensors located upstream of the at least one filter, wherein the one or more sensors are capable of measuring a component of the aqueous sample;

measuring the component of the aqueous sample using the one or more sensors, wherein the one or more sensors comprises a fluorometric sensor, wherein the fluorometric sensor measures a fluorescence intensity of the aqueous sample flowing through the at least one filter;

identifying a load on the at least one filter based upon the measuring of the component of the aqueous sample and at least one filtration characteristic, wherein the load is correlated to the fluorescence intensity; and determining the filter life of the at least one filter based upon the identifying the load.

2. The method of claim 1, wherein the component comprises chlorine.

3. The method of claim 1, wherein the measured component correlates to a concentration of the component in the aqueous sample.

4. The method of claim 1, wherein the measured component correlates to degradation of the at least one filter.

5. The method of claim 1, wherein the determining the filter life further comprises a known projected life of the at least one filter.

6. The method of claim 1, wherein the at least one filtration characteristic comprises a period of time, wherein the period of time corresponds to a time the at least one filter is in use.

7. The method of claim 1, wherein the at least one filtration characteristic comprises a cumulative counter, wherein the cumulative counter corresponds to a total amount of the component passed through the at least one filter.

8. The method of claim 1, wherein the determining the filter life further comprising assigning a confidence score to the filter life.

9. The method of claim 1, further comprising the determining the filter life based upon a user selected time range of the at least one filter.

10. The method of claim 1, wherein the aqueous sample comprises feed water of an industrial process.

* * * * *